No. 884,009. PATENTED APR. 7, 1908.
J. CHURCHWARD.
ART OF PRODUCING ALLOYED STEELS.
APPLICATION FILED SEPT. 18, 1907.
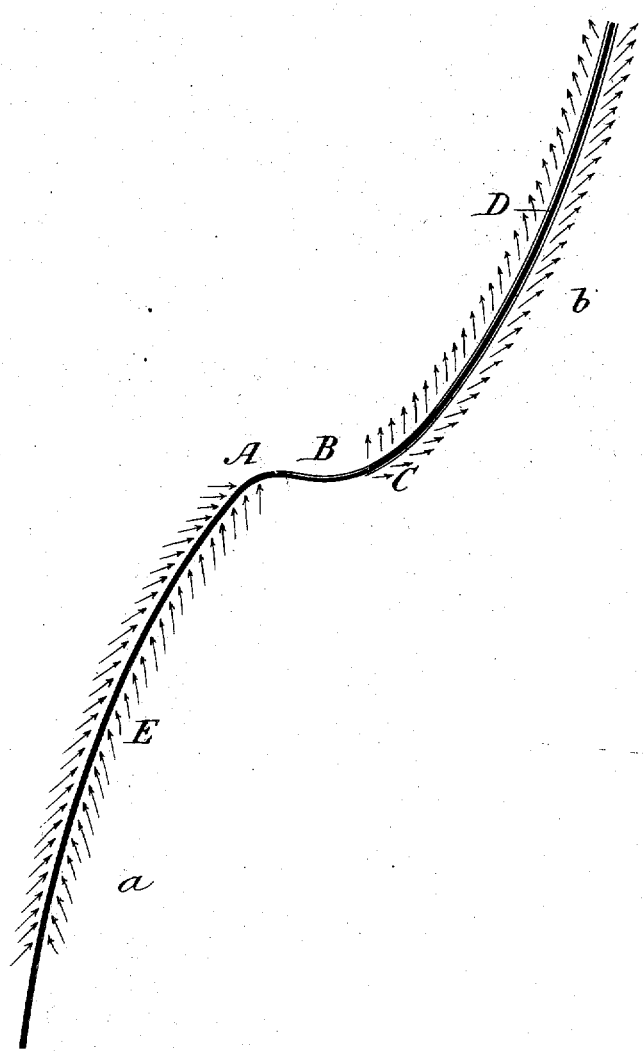

UNITED STATES PATENT OFFICE.

JAMES CHURCHWARD, OF NEW YORK, N. Y.

ART OF PRODUCING ALLOYED STEELS.

No. 884,009.     Specification of Letters Patent.     Patented April 7, 1908.

Application filed September 18, 1907. Serial No. 393,488.

*To all whom it may concern:*

Be it known that I, JAMES CHURCHWARD, a subject of the King of Great Britain, and a resident of the city, county, and State of New York, have invented certain Improvements in the Art of Producing Alloyed Steels, of which the following is a specification.

This invention relates to certain improvements in the art of producing alloyed steels, and has for its object to provide a process of a novel and simplified character whereby segregations of the alloying metals are restored and the producing of alloyed steels of homogeneous texture and possessed of improved physical properties is assured.

The invention consists in a process for the production of alloyed steels in which the melting of the component metals of the alloyed steel to be produced is accomplished with relation to certain temperatures and periods of time, all as will be hereinafter fully set forth.

Hitherto furnace heats or the temperatures of the metal bath have ordinarily not been carried beyond 2500 F. to 3000 F., when melting metals to form steel. If an alloyed steel is being manufactured these temperatures are not sufficiently high to bring the alloying metals into a proper condition for entry and interchange and consequently serious losses of the alloying metals occur, known among manufacturers, as furnace losses.

By entry and interchange I mean that action wherein the particles of the alloying metals are brought into intimate union with the particles of the iron or steel stock, entering into and exchanging there with and forming new compound molecules or particles in which the iron or steel and alloying metals become a part and parcel of each other, unless this interchange and intimate union takes place, the alloying metals can only become mere segregations in the mass, and since they are not in union the physical character of the product is greatly impaired. If the alloying metals are not brought into a proper condition, the entry and interchange can only be partial and a portion of the alloying metals will either be carried by the manganese contained in the bath to the surface, where it enters the slag, oxidizes and becomes lost, or the particles not entered of the alloying metals will cool in the mass in the fo of minute microscopical segregations. As soon as the alloying metals are brought into a proper condition for entry and interchange the manganese contained in the bath sets up a chemical action which forces the particles of the alloying metals to enter and interchange and be in intimate union with the steel or iron particles. This is the first chemical change after melting. Following this interchange and union there comes a period of inactivity of the alloying metals. The length of this period of inactivity is governed by the character of the alloying metals, the maximum temperature of the metal bath, and the percentage of manganese contained in the bath. Following this period of inactivity of the alloying metals, there comes a reverse chemical action whereby the molecules or particles of iron or steel, eject and throw out of union the particles of alloying metals, the particles thus thrown out floating or being carried up by the manganese to the surface, where they enter the slag and are lost.

A pure metal takes longer to melt and interchange than a ferro alloy, and the bath should be governed accordingly. There are two reasons why a ferro alloy melts quicker than a pure metal, namely: The iron of the alloy having a lower melting point than the alloying metal, melts first, thus releasing the alloying metal in the form of minute specks, which melt readily and rapidly. The carbon in the ferro alloy, when released, causes an artificial heat around itself, many hundreds of degrees higher than the temperature of the bath proper and this temporary chemical heat assists in melting the particles or specks of the alloying metals.

Each of the steel alloys takes a different period of time to enter and interchange and these periods vary from 30 seconds to 30 minutes dependent on how refractory the alloying metal is. By carrying out the temperature of the metal bath from about 3100° F. to about 3600° F. and holding it at this temperature for a period of from 15 to 60 minutes the metal becomes in a more receptive state to interchange and enter into union with the alloying metals than it does at a temperature below about 3100° F. Above about 3000° F. the metals make a better interchange and union than below about 3000° F. and the furnace losses do not amount to one half as much.

To enable manufacturers to better understand the meaning of this invention reference is had to the drawing which illustrates diagraphically the heat line and periods involved in the present invention, in which drawing A represents the point where the period of inactivity commences and which we designate the retardation point of the metal bath. At this point the movement of the alloying metals are temporarily stopped, retarded. B represents the period of time during which the alloy remains asleep or inactive and which we designate the period of rest. At the end of the period of rest is the point C where the reverse chemical action commences. We designate the reversing point and the period that follows this as the period of chemical reverse action and is represented at D on the drawing. After the melting takes place a period occurs during which the interchange and union is being accomplished and this period may be designated as the period of entry and interchange and is indicated at E on the drawing. The arrows at $a$ during the period of entry and interchange denote the alloy entering into intimate union with the stock iron or steel, and the arrows at $b$ during the period of reverse chemical action denote the alloying metal being ejected and thrown out by the mass molecules.

As an example to show how our invention works we will take a well known steel alloy, nickel-chromium-manganese. The furnace can be charged with percentages of Bessemer pig, nickel skulls—nickel shavings—nickel turnings etc. etc. with the necessary fluxing material. With this charge the furnace may be carried to a temperature of about 3100° F. to about 3600° F. and after being held at this temperature for a short period, a percentage of manganese should be added to recarburize the bath, cleanse the bath of gases and float up oxidations and impurities to the surface. The balance of nickel necessary to make up the percentage required in the finished product can now be added. The metal bath should remain at its maximum temperature after this addition for a period of from 15 to 60 minutes, depending on the temperature of the bath. At the expiration of this period of time the chromium can be added, with some manganese with it. From 15 to 40 minutes after this addition the furnace should be tapped and the heat run out into the ladle. The furnace should be tapped during the period of rest and on no account should it be allowed to go beyond the reversing point where it will enter the period or zone of reverse chemical action. Directly the bath is carried beyond this point losses of the refractory alloying metal take place and these losses will be in proportion to the length of time the furnace remains untapped after the reversing point has been reached and passed. If the bath is continued long enough in this zone nine-tenths of all refractory alloys will be ejected and lost. If the bath is tapped before the retardation point is reached the interchange and union will not have been completed and such interchange being only partial, a portion of the refractory alloys will cool in the mass in the form of minute microscopical segregations, thus failing to impart their full value of force and energy to the mass molecule and consequently to the mass itself. The finished product will not have the full physical qualities it would have had, had the alloying metals been properly brought into intimate union with the mass molecules.

Any or all combinations of alloying metals can be successfully worked by this method, taking care that each and every one has the full period of time necessary for its entry and interchange and that none are carried beyond the period of rest. All non-refractory metals of the nickel family can be added to the metal bath at an early stage of the heat. All refractory metals must be added after the bath is in a fit state to receive them and vanadium can only be added to the ladle. These temperatures and periods of time are especially valuable to the following chemical compounds, viz. nickel, chromium and manganese;—nickel, chromium, tungsten and manganese;—nickel, chromium, vanadium and manganese;—nickel, chromium, tungsten, vanadium and manganese, and are also available for any other combination of steel and steel alloys.

I do not limit my invention to the use of basic or open hearth furnaces, since the process is equally applicable to all furnaces and crucibles, and the words metal bath as herein used are intended to include all these.

Having thus described my invention I claim:—

1. The herein described process of producing alloyed steel which consists in melting the component metals at a temperature of from about 3100° F. to about 3600° F., and holding the metal bath at its maximum temperature for a period of from 15 to 60 minutes.

2. The herein described process of producing alloyed steel which consists in melting iron or steel with a non-refractory metal at a temperature of from about 3100° F. to about 3600° F., and holding the metal bath at its maximum temperature for from 15 to 60 minutes.

3. The herein described process of producing alloyed steel which consists in melting iron or steel with the alloying metals nickel and manganese at a temperature of from about 3100° F. to about 3600° F., holding the metal bath at its maximum temperature for from 15 to 60 minutes, then adding chromium, or chromium and tungsten then holding the metal bath for a period of from 15 to 40 minutes at not substantially less than 3000 F. then tapping the furnace and running the heat out into the ladle.

4. The herein described process of producing alloyed steel which consists in melting iron or steel with a non-refractory metal at a temperature of from about 3100° F. to about 3600° F., holding the metal bath at its maximum temperature for from 15 to 60 minutes, then adding a refractory metal, then holding the metal bath for a period of from 15 to 40 minutes at not substantially less than 3000 F., and then tapping the furnace.

5. The herein described process of producing alloyed steel which consists in melting iron or steel with a non-refractory metal at a temperature of from about 3100° F., to about 3600° F., holding the metal bath at its maximum temperature for from 15 to 60 minutes, then adding chromium and tungsten, then holding the metal bath for a period of from 15 to 40 minutes at not substantially less than 3000 F. and then tapping the furnace.

6. The herein described process of producing alloyed steel which consists in melting iron or steel with non-refractory alloying metals at a temperature of from about 3100° F. to about 3600° F., holding the metal bath at its maximum temperature for a period of from 15 to 60 minutes then adding a refractory alloying metal, then holding the metal bath for a period of from 15 to 40 minutes at not substantially less than 3000 F., then tapping the furnace and running the heat out into the ladle and then adding vanadium to the ladle.

7. The herein described process of producing alloyed steel which consists in melting iron or steel with non-refractory alloying metals at a temperature of from about 3100° F. to about 3600° F., holding the metal bath at its maximum temperature for a period of from 15 to 60 minutes then adding a refractory alloying metal then holding the metal bath for a period of from 15 to 40 minutes at not substantially less than 3000 F., then tapping the furnace and running the heat out into the ladle, and then adding vanadium and tungsten to the ladle.

In witness whereof I have hereunto signed my name this 17th day of September 1907, in the presence of two subscribing witnesses.

JAMES CHURCHWARD.

Witnesses:
    J. D. COPLINGER,
    F. W. WIMAN.